(12) United States Patent
Eade et al.

(10) Patent No.: US 6,597,226 B1
(45) Date of Patent: Jul. 22, 2003

(54) APPLICATION SPECIFIC INTEGRATED CIRCUIT ARCHITECTURE UTILIZING SPREAD SPECTRUM CLOCK GENERATOR MODULE FOR REDUCING EMI EMISSIONS

(75) Inventors: Tom Jon Eade, Lexington, KY (US); Brian Keith Owens, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 0 days.

(21) Appl. No.: 09/615,619

(22) Filed: Jul. 13, 2000

(51) Int. Cl.[7] .................................................. G06F 1/04
(52) U.S. Cl. ...................................... 327/292; 327/565
(58) Field of Search ................................ 327/291, 292, 327/293, 295, 564, 565

(56) References Cited

U.S. PATENT DOCUMENTS

| | | |
|---|---|---|
| 5,488,627 A | 1/1996 | Harding et al. |
| 5,610,955 A | 3/1997 | Bland |
| 5,631,920 A | 5/1997 | Hardin |
| 5,659,587 A | 8/1997 | Knierim |
| 5,867,524 A | 2/1999 | Booth et al. |
| 5,872,807 A | 2/1999 | Booth et al. |
| 5,943,382 A | 8/1999 | Li et al. |
| 6,169,889 B1 * | 1/2001 | Servilio et al. ............. 455/296 |
| 6,240,123 B1 * | 5/2001 | Zhang et al. ............... 375/130 |

* cited by examiner

*Primary Examiner*—Timothy P. Callahan
*Assistant Examiner*—Cassandra Cox
(74) *Attorney, Agent, or Firm*—Taft, Stettinius & Hollister LLP

(57) ABSTRACT

The invention provides an ASIC architecture that incorporates an SSCG module therein and that utilizes both a frequency modulated clock signal and a pure clock signal, where both clock signals are substantially synchronized and where the ASIC architecture minimizes the number of pins and silicon area needed to provide the dual clock signals. Additionally, because the clock signals are derived from the same externally generated clock signal and are received into the ASIC through the same clock input buffer, the clock signals on both branch paths will be substantially synchronized, thereby reducing drift, skew or delay errors in the clock I/O buffers, between the various sections of the integrated circuit and/or between the various components coupled to, or part of the electronic device in which the integrated circuit is a part.

19 Claims, 2 Drawing Sheets

APPLICATION SPECIFIC INTEGRATED CIRCUIT ARCHITECTURE UTILIZING SPREAD SPECTRUM CLOCK GENERATOR MODULE FOR REDUCING EMI EMISSIONS

BACKGROUND

A common challenge confronted in the design of high performance, microprocessor-based devices is the reduction and control of electromagnetic interference ("EMI") generated and/or radiated from such devices. Products, such as computers, having excessive EMI emissions may adversely affect the performance and operation of other electronic products situated close by. Therefore, many governmental agencies, including the FCC in the United States, have established limits on EMI emissions by products incorporating such devices. Specifically, FCC regulations specify how much electromagnetic energy a product may radiate at any particular frequency.

U.S. Pat. Nos. 5,488,627, 5,631,920, 5,867,524 and 5,872,807 provide spread spectrum clock generator ("SSCG") circuit modules designed to reduce the EMI emissions in an electronic device by conditioning the clock signals driving microprocessor-based components (or other specialized circuits) in the electronic device. These modules frequency modulate an externally generated clock signal (such as a signal generated by a piezoelectric crystal driven at its resonant frequency by a suitable driver or oscillator circuit) to provide a spread spectrum output clock signal, which is used to drive the microprocessor-based components (or other specialized circuits) in the electronic device. The frequency modulation of the clock signal reduces spectral amplitude of the EMI components at each harmonic of the clock when compared to the spectrum of the same clock signal without modulation.

It is common for electronic components, such as printers, fax machines, scanners, etc., to utilize at least one application-specific integrated circuit ("ASIC") device in place of, or in addition to, microprocessor-based circuits. ASIC devices are advantageous for many reasons. For example, since ASIC devices do not rely upon the use of software to control the functions of a microprocessor, the ASIC devices are typically more robust. Additionally, since ASIC devices are usually designed for a specific application, they can be designed to operate faster and can be less expensive than microprocessor-based circuits. Of course, the expense of the ASIC device, and in-turn, the electronic component utilizing the ASIC device, is dependent upon the number of pins and silicon area necessary for the ASIC device.

Due to the EMI concerns discussed above, it may be advantageous to design certain ASIC devices to incorporate SSCG modules in their architecture. One possible disadvantage with this architecture is that some internal or external components, such as USB (universal serial bus) modules, operatively coupled to, or part of the electronic device are not compatible with the frequency modulated clock output of the SSCG modules; and hence, certain sections of the ASIC that are designed to control or be operatively coupled to such external components may need to be designed to operate with and provide clock signals that are not frequency modulated ("pure" clock signals). If separate clock sources are utilized by the ASIC, however, there may arise synchronization problems and drift/skew/delay errors in the clock I/O buffers, between the various sections of the ASIC and/or between the various components coupled to, or part of the electronic device.

Therefore, there is a need for an ASIC architecture that incorporates an SSCG module therein and that utilizes and/or provides both a frequency modulated clock signal and an unmodulated clock signal, where the frequency modulated clock signal and the unmodulated clock signal are synchronized and where the ASIC architecture minimizes the number of pins and silicon area needed for the ASIC device.

SUMMARY

The present invention provides an ASIC architecture that incorporates an SSCG module therein and that utilizes both a frequency modulated clock signal and an unmodulated clock signal, where both clock signals are substantially synchronized and where the ASIC architecture minimizes the number of external pins and silicon area needed to provide the dual clock signals.

One aspect of the present invention provides a clock tree configuration for an integrated circuit, such as an application specific integrated circuit (ASIC), that includes: (a) a clock signal input trunk path for receiving an externally generated clock signal, which may be a pure clock signal; (b) a conditioning module operatively coupled to the input trunk path for receiving the externally generated clock signal and for generating a spread spectrum clock signal at a first output thereof; (c) a first branch path extending from the first output of the conditioning module for carrying the spread spectrum clock signal to at least a first section of the integrated circuit; and (d) a second branch path extending from one of (i) the input trunk path and (ii) the conditioning module, for carrying the externally generated clock signal to at least a second section of the integrated circuit. The conditioning module may include a second output to which the externally generated signal is passed, such that the second branch path extends from the second output of the conditioning module. Alternatively, the second branch path may extend directly from the input trunk. Preferably, the input trunk path includes the only clock signal input for the integrated circuit, thereby reducing the number of pin-outs (i.e. external pins) and silicon area necessary for the integrated circuit. Additionally, because the clock signals on both branch paths are derived from the same externally generated clock signal, the clock signals on both branch paths will be substantially synchronized, thereby reducing drift, skew or delay errors in the clock I/O buffers, between the various sections of the integrated circuit and/or between the various components coupled to, or part of the electronic device in which the integrated circuit is a part.

Another aspect of the present invention provides a clock signal circuit arrangement that includes: (a) a clock signal generator for generating a substantially stable clock signal; and (b) an integrated circuit, such as an ASIC, having a clock tree including: (i) an input trunk operatively coupled to the clock signal generator for receiving the substantially stable clock signal; (ii) a conditioning circuit operatively coupled to the input trunk path for receiving the substantially stable clock signal and for generating a spread spectrum clock signal at a first output thereof; (iii) a first branch path extending from the first output of the conditioning circuit for carrying the spread spectrum clock signal to at least a first section of the integrated circuit; and (iv) a second branch path extending from one of the input trunk and the conditioning circuit for carrying the externally generated clock signal to at least a second section of the integrated circuit. The conditioning circuit may include a second output to which the externally generated signal is passed, such that the second branch path extends from the second output of the conditioning circuit. Alternatively, the second branch path may extend directly from the input trunk. Preferably, the input trunk path includes the only clock signal input for the integrated circuit, thereby reducing the number of pin-outs (i.e. external pins) and silicon area necessary for the integrated circuit. Additionally, because the clock signals on both branch paths are derived from the same externally generated clock signal, the clock signals on both branch paths will be substantially synchronized, thereby reducing drift, skew or delay errors in the clock I/O buffers, between the various sections of the integrated circuit and/or between the various components coupled to, or part of the electronic device in which the integrated circuit is a part.

Another aspect of the present invention provides a method for reducing EMI emissions of an ASIC device while maintaining a suitable timing scheme within the ASIC device. This method includes the steps of: (a) receiving a substantially stable clock signal input trunk of the ASIC device; (b) embedding an SSCG within the ASIC device on a path to receive the substantially stable clock signal from the input trunk; (c) generating a spread spectrum clock signal at an output of the SSCG module; (d) directing the spread spectrum clock signal along a first clock signal branch of the ASIC device to at least a first section of the ASIC device; (e) providing a second clock signal branch within the ASIC device along a path to receive the substantially stable clock signal; and (f) directing the substantially stable clock signal along the second clock signal branch to at least a second section of the ASIC device.

DETAILED DESCRIPTION

The present invention provides an ASIC architecture that incorporates an SSCG module therein and that utilizes both a frequency modulated clock signal and a pure clock signal, where both clock signals are substantially synchronized and where the ASIC architecture minimizes the number of external pins and silicon area needed to provide the dual clock signals.

Figure 1:
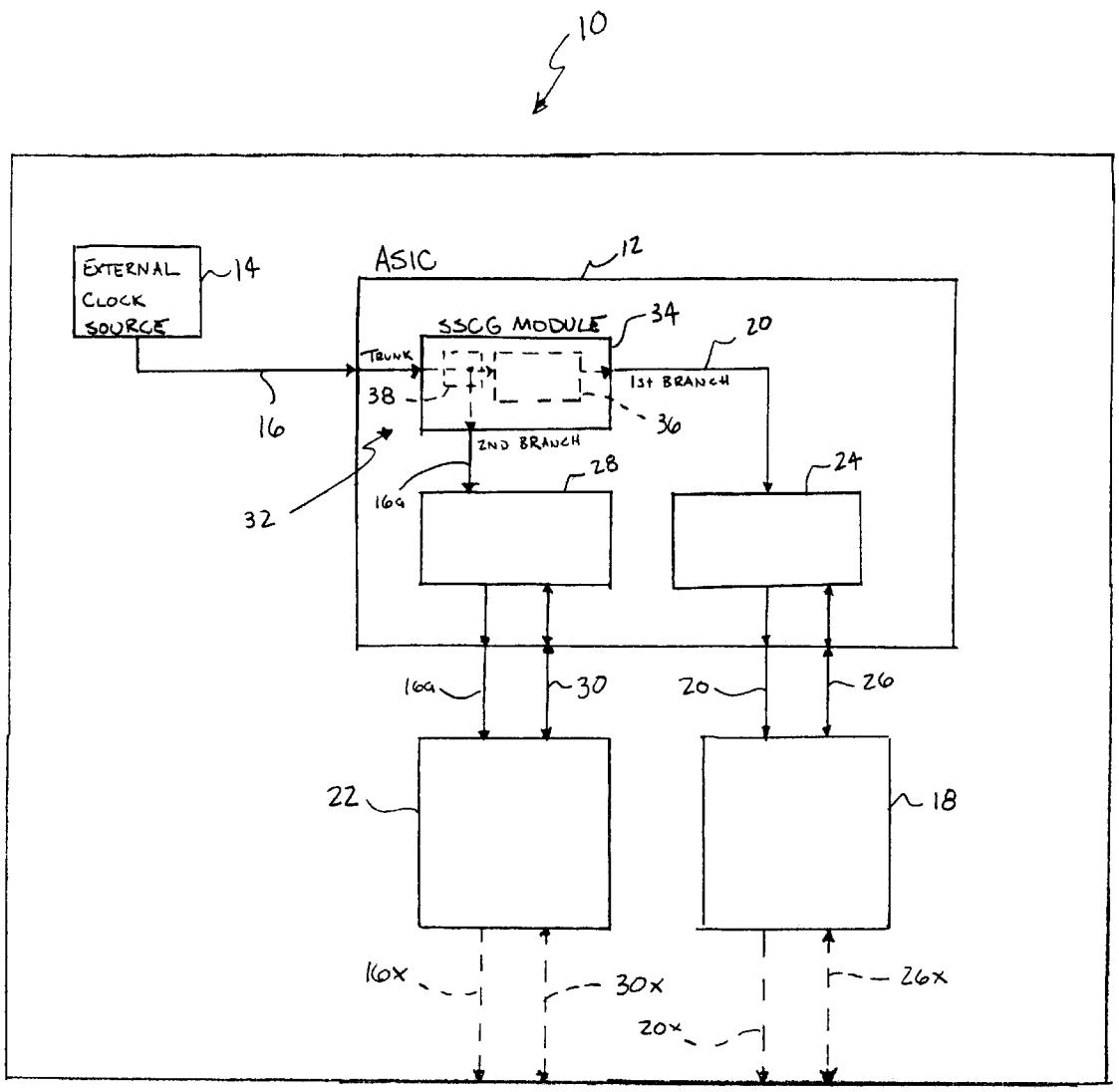
FIG. 1 is a schematic block diagram of an electronic component incorporating an ASIC having a clock tree architecture design according to a first embodiment of the present invention.

As shown in FIG. 1, an electronic component 10, such as a printer, fax machine, scanner, computer and the like, includes an application specific integrated circuit ("ASIC") 12, for controlling various devices within or operatively coupled to the electronic component 10. The ASIC 12 is operatively coupled to an external clock source 14, such as an oscillator, crystal, or resonator as known by those of ordinary skill in the art. The external clock source 14 provides a "pure" clock signal 16, that is, a clock signal having a substantially constant frequency, or a clock signal that is "unimodulated." Some of the devices controlled by the ASIC 12, such as device 18, are capable of being controlled by the ASIC 12 using frequency modulated clock signals 20. This device 18 can be, for example, an ink-jet printhead, a parallel port or a motor controller. Other of these devices, such as device 22, are not particularly compatible with being controlled by the ASIC 12 using frequency modulated clock signals; and, therefore, this device 22 is controlled by the ASIC 12 using clock signals 16a having a substantially constant frequency. This clock signal 16a may be the same clock signal 16 provided by the external clock source 14 or alternatively may be derived from the clock signal 16 provided by the external clock source 14. The device 22 that is controlled by the ASIC 12 using clock signals 16a having a substantially constant frequency can include, for example, USB components and interfaces, and certain optical components used with scanners.

As will be apparent to those of ordinary skill in the art, device 18 and/or device 22 may be I/O devices for communicating with external devices via signals 20x, 26x and/or 16x, 30x.

The ASIC 12 includes a section 24, specifically designed to control the device 18 using the frequency modulated clock signals 20 and other control/data signals 26; a section 28, specifically designed to control the device 22 using the substantially constant frequency clock signal 16a and other control/data signals 30; and a clock tree 32, which receives the pure clock signal 16 on an input trunk and generates a frequency modulated clock signal 20 on a first branch and a substantially constant frequency clock signal 16a on a second branch. The clock tree 32 includes a spread spectrum clock generator ("SSCG") module 34 that utilizes SSCG circuitry 36 designed according to the circuits and modules provided in U.S. Pat. Nos. 5,488,627, 5,631,920, 5,867,524 and 5,872,807, the disclosures of which are incorporated herein by reference. Such SSCG circuits modulate the pure clock signal 16 received on the input trunk to provide the spread spectrum, frequency modulated output clock signal 20. As discussed above, the frequency modulated clock signal helps reduce the EMI emissions of the electronic component 10. As will be apparent to those of ordinary skill in the art, other suitable SSCG circuits are also available for use with the SSCG module 34, and the use of such alternate circuits is within the scope of the present invention.

Depending upon the application, it may not be possible or desirable to incorporate certain portions of the SSCG circuitry 36 (such as frequency filters or certain capacitors), into the ASIC device 12; and thus, such portions may need to reside external to the ASIC device. Of course, with such external positioning of these components, additional pins will need to be provided on the ASIC to allow connections between these external components and the remaining SSCG circuitry 36.

The SSCG module 34 also includes circuitry 38 for deriving the constant frequency clock signal 16a from the pure clock signal 16 received on the input trunk. Such circuitry 38 may merely provide a direct coupling of the second branch to the trunk or may condition the clock signal 16a to, for example, improve the synchronization between the first and second branch clock signals 20, 16a. For example, the zero crossing of the unmodulated clock signal 16a may be brought to coincide with the zero crossing of the nominal (i.e., center) frequency of the SSCG signal 20. Circuitry 38 merely may provide buffering to drive both the SSCG input clock buffer in the SSCG circuitry 36 and the substantially constant clock signal 16a, or it may also provide a frequency multiplication function in addition to the clock buffer and drive functions.

Figure 2:
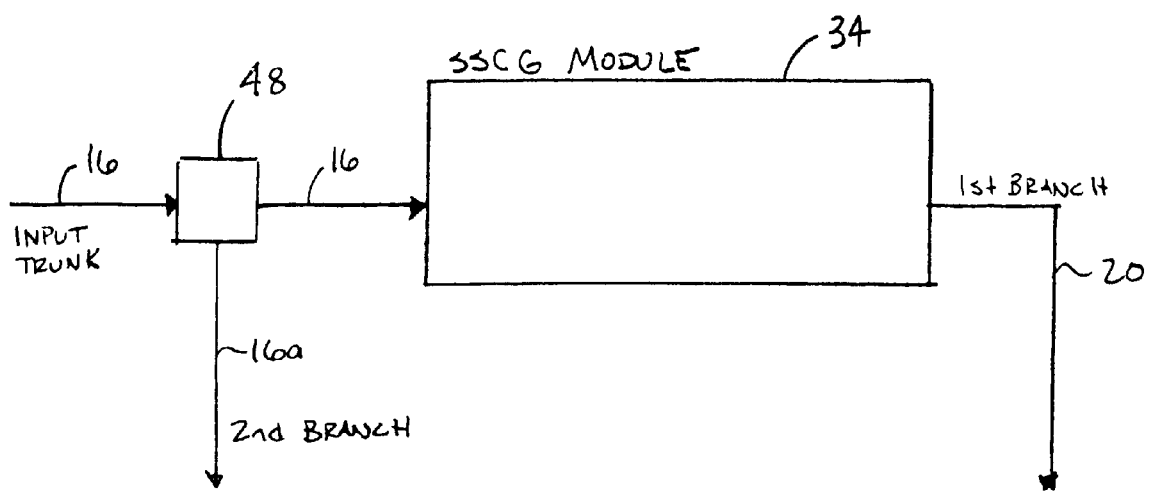
FIG. 2 is a schematic block diagram of a clock tree architecture for use in an ASIC according to a second embodiment of the present invention.

As shown in FIG. 2, a similar buffer circuit 48 may be positioned within the ASIC 12 outside of the SSCG module 34. As in FIG. 1, the circuitry 48 derives the constant frequency clock signal 16a from the pure clock signal 16 received on the input trunk. The circuitry 48 may merely provide a direct coupling of the second branch to the trunk or may condition the clock signal 16a by use of buffers, or in some cases may perform a frequency multiplication in addition to the buffering function.

An alternative embodiment could utilize additional SSCG module functions, such as a Reset or Synchronize inputs, to provide for better synchronization between the SSCG clock signal 20 and the substantially constant clock signal 16a. This type of external logic signal synchronization is not necessarily required for correct operation of the present invention, but provides an additional optional function that can be utilized in systems where "hard" synchronization is a desired parameter in the clock architecture.

It will be apparent to those of ordinary skill in the art that modifications may be made to the preferred embodiments of the invention, described above, without departing from the scope of the invention defined by the following claims:

What is claimed is:

1. An integrated circuit clock tree configuration, comprising:
   a clock signal input trunk path for receiving a source clock signal generated by a clock source;
   a conditioning circuit operatively coupled to the input trunk to receive the source clock signal, the conditioning circuit generating a spread spectrum clock signal from the source clock signal and providing the spread spectrum clock signal at a first output thereof;
   a first branch path extending from the first output of the conditioning circuit, carrying the spread spectrum clock signal to at least a first section of the integrated circuit; and
   a second branch path in said integrated circuit, carrying a substantially constant frequency clock signal derived from the source clock signal to at least a second section of the integrated circuit;
   wherein the second section of the integrated circuit includes a USB module.

2. The integrated circuit clock tree configuration of claim 1, wherein the second branch path is directly coupled to the input trunk.

3. The integrated circuit clock tree configuration of claim 1, wherein the clock signal input trunk path comprises the only clock signal input to the integrated circuit clock tree configuration.

4. The integrated circuit clock tree configuration of claim 1, wherein the integrated circuit comprises an application specific integrated circuit (ASIC).

5. A clock signal circuit arrangement, comprising:
   a clock signal generator for generating a substantially stable clock signal;
   an integrated circuit having a clock tree, including:
      an input trunk path operatively coupled to the clock signal generator for receiving the substantially stable clock signal;
      a conditioning circuit operatively connected to the input trunk path to generate a spread spectrum clock signal at a first output thereof from the substantially stable clock signal;
      a first branch path extending from the first output of the conditioning circuit for carrying the spread spectrum clock signal to at least a first section of the integrated circuit; and
      a second branch path in said integrated circuit, carrying a substantially constant frequency clock signal derived from the substantially stable clock signal to at least a second section of the integrated circuit;
   wherein the second section of the integrated circuit includes a USB module.

6. The clock signal circuit arrangement of claim 5, wherein the second branch path is directly coupled to the input trunk path.

7. The clock signal circuit arrangement of claim 5, wherein the clock signal input trunk path comprises the only clock signal input to the integrated circuit clock tree configuration.

8. The clock signal circuit arrangement of claim 5, wherein the integrated circuit comprises an application specific integrated circuit (ASIC).

9. The clock signal circuit arrangement of claim 5, wherein the clock signal generator is selected from a group consisting of an oscillator, a crystal, and a resonator.

10. A method for reducing EMI emissions of an ASIC while maintaining a suitable timing scheme within the ASIC, the method comprising the steps of:
    receiving a substantially stable, source clock signal at a clock signal input trunk of the ASIC;
    embedding an SSCG module within the ASIC on a path to receive the substantially stable, source clock signal from the input trunk;
    generating a spread spectrum clock signal at an output of the SSCG module from the substantially stable, source clock signal;
    directing the spread spectrum clock signal along a first clock signal branch of the ASIC to at least a first section of the ASIC;
    deriving a substantially stable, driving clock signal from the substantially stable, source clock signal within the ASIC; and
    directing the substantially stable, driving clock signal along a second clock signal branch of the ASIC to at least a second section of the ASIC;
    wherein the second section of the ASIC includes a USB module.

11. The method of claim 10, further comprising:
    substantially synchronizing said spread spectrum clock signal and said substantially stable, driving clock signal.

12. An integrated circuit clock tree configuration, comprising:
    a clock signal input trunk path for receiving a source clock signal generated by a clock source;
    a conditioning circuit operatively coupled to the input trunk to receive the source clock signal, the conditioning circuit generating a spread spectrum clock signal from the source clock signal and providing the spread spectrum clock signal at a first output thereof;
    a first branch path extending from the first output of the conditioning circuit, carrying the spread spectrum clock signal to at least a first section of the integrated circuit; and
    a second branch path in said integrated circuit, carrying a substantially constant frequency clock signal derived from the source clock signal to at least a second section of the integrated circuit;
    wherein the conditioning circuit derives the substantially constant frequency clock signal from the source clock signal; and
    wherein the conditioning circuit includes a frequency multiplier.

13. The integrated circuit clock tree configuration of claim 12, wherein said spread spectrum clock signal and said substantially constant frequency clock signal are substantially synchronized.

14. A clock signal circuit arrangement, comprising:
  a clock signal generator for generating a substantially stable clock signal;
  an integrated circuit having a clock tree, including:
    an input trunk path operatively coupled to the clock signal generator for receiving the substantially stable clock signal;
    a conditioning circuit operatively connected to the input trunk path to generate a spread spectrum clock signal at a first output thereof from the substantially stable clock signal;
    a first branch path extending from the first output of the conditioning circuit for carrying the spread spectrum clock signal to at least a first section of the integrated circuit; and
    a second branch path in said integrated circuit, carrying a substantially constant frequency clock signal derived from the substantially stable clock signal to at least a second section of the integrated circuit;
  wherein the conditioning circuit derives the substantially constant frequency clock signal from the substantially stable clock signal; and
  wherein the conditioning circuit includes a frequency multiplier.

15. The clock signal circuit arrangement of claim 14, wherein said spread spectrum clock signal and said substantially constant frequency clock signal are substantially synchronized.

16. The clock signal circuit arrangement of claim 14, wherein said spread spectrum clock signal and said substantially stable clock signal are substantially synchronized.

17. A method for reducing EMI emissions of an ASIC while maintaining a suitable timing scheme within the ASIC, the method comprising the steps of:
  receiving a substantially stable, source clock signal at a clock signal input trunk of the ASIC;
  embedding an SSCG module within the ASIC on a path to receive the substantially stable, source clock signal from the input trunk;
  generating a spread spectrum clock signal at an output of the SSCG module from the substantially stable, source clock signal;
  directing the spread spectrum clock signal along a first clock signal branch of the ASIC to at least a first section of the ASIC;
  deriving a substantially stable, driving clock signal from the substantially stable, source clock signal within the ASIC; and
  directing the substantially stable, driving clock signal along a second clock signal branch of the ASIC to at least a second section of the ASIC;
  wherein the step of deriving the driving clock signal from the source clock signal includes the step of conditioning the source clock signal;
  wherein the conditioning step includes the step of multiplying the source clock signal.

18. A method for reducing EMI emissions of an ASIC while maintaining a suitable timing scheme within the ASIC, the method comprising the steps of:
  receiving a substantially stable, source clock signal at a clock signal input trunk of the ASIC;
  embedding an SSCG module within the ASIC on a path to receive the substantially stable, source clock signal from the input trunk;
  generating a spread spectrum clock signal at an output of the SSCG module from the substantially stable, source clock signal;
  directing the spread spectrum clock signal along a first clock signal branch of the ASIC to at least a first section of the ASIC;
  deriving a substantially stable, driving clock signal from the substantially stable, source clock signal within the ASIC; and
  directing the substantially stable, driving clock signal along a second clock signal branch of the ASIC to at least a second section of the ASIC;
  wherein the step of deriving the driving clock signal from the source clock signal includes the step of conditioning the source clock signal;
  wherein the conditioning step includes the step of buffering the source clock signal.

19. A method for reducing EMI emissions of an ASIC while maintaining a suitable timing scheme within the ASIC, the method comprising the steps of:
  receiving a substantially stable, source clock signal at a clock signal input trunk of the ASIC;
  embedding an SSCG module within the ASIC on a path to receive the substantially stable, source clock signal from the input trunk;
  generating a spread spectrum clock signal at an output of the SSCG module from the substantially stable, source clock signal, the spread spectrum clock signal having a nominal frequency;
  directing the spread spectrum clock signal along a first clock signal branch of the ASIC to at least a first section of the ASIC;
  deriving a substantially stable, driving clock signal from the substantially stable, source clock signal within the ASIC; and
  directing the substantially stable, driving clock signal along a second clock signal branch of the ASIC to at least a second section of the ASIC;
  wherein the steps of generating the spread spectrum clock signal and deriving the driving clock signal include the step of coinciding zero crossings of the driving clock signal and zero crossings of the nominal frequency of the spread spectrum clock signal, thereby improving synchronization between the driving clock signal and the spread spectrum clock signal.

* * * * *